United States Patent Office 3,182,068
Patented May 4, 1965

3,182,068
CERTAIN 3-ARYL-1,4,2-OXATHIAZOL-ONE-5-COMPOUNDS
Klaus Sasse, Cologne-Stammheim, Richard Wegler, Leverkusen, and Ludwig Eue, Cologne-Stammheim, Germany, assignors to Farbenfabriken Bayer Aktiengesellschaft, Leverkusen, Germany, a German corporation
No Drawing. Filed May 1, 1963, Ser. No. 277,113
Claims priority, application Germany, May 9, 1962, F 36,748
8 Claims. (Cl. 260—306.7)

The present invention concerns novel oxathiazol-ones which exhibit strong insecticidal and fungicidal properties and in particular properties which influence plant growth.

The thiohydroxamic acids on which the oxathiazol-ones according to the invention are based are already known. However, they only exhibit very weak herbicidal properties or none at all.

It is an object of the present invention to provide a novel process for the production of oxathiazol-ones. A further object of the invention consists in providing novel oxathiazol-ones which exhibit insecticidal, fungicidal, as well as herbicidal properties. Other objects of the invention are indicated by the following description and the examples.

It has been found that the novel 3-aryl-1,4,2-oxathiazol-one(s)-5 of the formula $$\text{Ar}-\text{C}\begin{smallmatrix}\nearrow\text{N}-\text{O}\\ \searrow\text{S}-\text{C}=\text{O}\end{smallmatrix}$$
I wherein Ar represents aryl radicals optionally substituted by alkyl, alkoxy, alkylmercapto, nitro, and halogen, exhibit strong insecticidal, fungicidal, and especially herbicidal properties.

In addition, it has been found that oxathiazol-ones of Formula I are obtained when aromatic thiohydroxamic acids of the formula $$\text{Ar}-\text{C}\begin{smallmatrix}\nearrow\text{N}-\text{OH}\\ \searrow\text{SH}\end{smallmatrix}$$
II wherein Ar has the same significance as in Formula I, are reacted with phosgene.

The fact that the oxathiazol-ones according to the invention exhibit strong biocidal and in particular herbicidal properties, in contrast to the previously known thiohydroxamic acids, must be regarded as distinctly surprising.

The thiohydroxamic acids to be employed for the process according to the invention are clearly characterised by the formula given above. In this, Ar preferably represents aryl radicals such as phenyl and naphthyl, which may be substituted by alkyl, alkoxy, and alkylmercapto with 1–4 carbon atoms in each case, by the nitro group and also by halogen, particularly by chloride and bromine.

The process according to the invention is preferably carried out in the presence of acid binding agents.

Aqueous alkali metal hydroxides as well as alkali metal carbonates and tertiary amines have proved particularly suitable for this purpose. In addition, it is possible to allow the reaction according to the process to proceed in the presence of inert organic solvents or diluents.

The compounds according to the invention are characterised by good insecticidal and fungicidal properties. However, the products of the process have a particular practical significant owing to their pronounced strong herbicidal activity which they develop on living plants. These properties of the oxathiazol-ones obtainable in accordance with the invention, which are extremely valuable in technical application, are evident from the following experimental report.

Some experimental results are summarised below in the form of tables which were obtained during the treatment of different types of plants after their germination (post emergence).

The tests are carried out by the normal procedure in accordance with the post emergence method. The compositions are prepared by taking up the active agent in about 4 times its weight of dimethylformamide, and by diluting the resultant concentrate with water to give the desired concentrations, with the addition of poly-oxyethylene benzyl ether as the emulsifying agent.

The resultant compositions are sprayed onto plants of the specified type when their height is 5–15 cm. Three weeks later, an evaluation of the effect is made according to 6 grades, where 0–5 have the significance specified in the Table I. Results, see Tables I and Ia.

In order to estimate the herbicidal activity before germination (pre-emergence), seeds of the different plants were sown in ordinary soil and 24 hours later treated with a composition of 3-(2,6-dichlorophenyl)-1,4,2-oxathiazol-one-5 at the stated concentration. The degree of damage or the degree of germination, respectively, was evaluated after an interval of 3 weeks. During this procedure, the indices 0–5 have the following significance:

0 = no effect
1 = slight damage or inhibition of growth
2 = distinct damage or inhibition of growth
3 = heavy damage, or only 50% germinated
4 = plants partly destroyed after germination, or only 25% germinated
5 = plants wholly killed, or 100% non-germinated Results, see Table II.

TABLE I

| Product | Concn. of active agent, as percent | Herbicidal activity when applied against— | | | | | | | | | | |
|---|---|---|---|---|---|---|---|---|---|---|---|---|
| | | Millet | Beet | Oats | Cotton | Wheat | Mustard | Tomatoes | Beans | Portulacca | Chickweed | Groundsel |
| 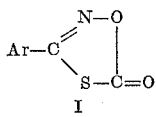 | 0.4<br>0.2<br>0.1 | 5<br>5<br>5 | 5<br>5<br>5 | --------<br>--------<br>-------- | 5<br>5<br>2 | 3–4<br>2<br>0 | --------<br>--------<br>-------- | 5<br>5<br>1 | 4<br>2<br>1 | --------<br>--------<br>-------- | --------<br>--------<br>-------- | --------<br>--------<br>-------- |
| 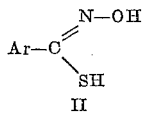 | 0.4<br>0.2<br>0.1 | 5<br>4–5<br>4 | 5<br>4–5<br>4–5 | 4–5<br>4<br>3–4 | 5<br>5<br>5 | 2–3<br>2<br>1–2 | 5<br>5<br>5 | 5<br>5<br>4–5 | 5<br>5<br>4 | 5<br>5<br>4 | 5<br>5<br>4–5 | 5<br>5<br>2 |

In the above table, the individual indices have the following significance:
0 = no effect; 1 = individual slight smut spots; 2 = distinct peripheral smut marks; 3 = heavy damage; 4 = half the leaves destroyed; 5 = plant is dead.

TABLE Ia

| Product | Concn. of active agent, as percent | Herbicidal activity on application against— | | | | | | | |
|---|---|---|---|---|---|---|---|---|---|
| | | Millet | Beet | Oats | Cotton | Wheat | Mustard | Tomatoes | Beans |
| 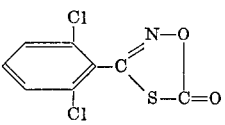 | 0.4<br>0.2<br>0.1 | 5<br>3<br>3 | 5<br>5<br>5 | 5<br>5<br>4 | 4-5<br>2<br>1 | 5<br>4-5<br>4-5 | 5<br>3<br>2 | 3-4<br>2<br>2 | 4-5<br>2<br>2 |
| 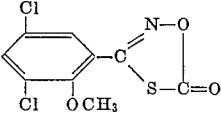 | 0.4 | 4 | 4 | 4 | 1 | 1 | 5 | 3 | 1 |
| 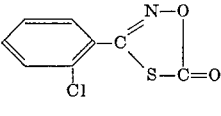 | 0.4<br>0.2<br>0.1 | 4<br>4<br>4 | 5<br>5<br>5 | 4<br>3<br>2 | 5<br>5<br>2 | 3<br>1<br>0 | 5<br>4-5<br>4-5 | 4<br>2<br>0 | 5<br>4-5<br>3 |
| 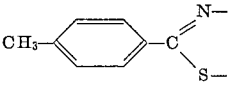 | 0.4<br>0.2<br>0.1 | 5<br>5<br>5 | 4<br>4<br>2 | 4<br>3<br>2 | 5<br>2<br>1 | 3<br>1<br>0 | 5<br>5<br>4 | 1<br>0<br>0 | 4<br>3<br>2 |

TABLE II

| Conc. (kg./hectare) | Millet | Beet | Oats | Cotton | Wheat | Mustard |
|---|---|---|---|---|---|---|
| 10 | 5 | 5 | 5 | 5 | 5 | 5 |
| 5 | 5 | 5 | 5 | 5 | 5 | 5 |
| 2.5 | 5 | 5 | 5 | 4 | 4 | 5 |
| 1.25 | 2 | 5 | 5 | 3 | 4 | 4 |
| 0.625 | 0 | 5 | 5 | 0 | 1 | 4 |

The following examples are given for the purpose of illustrating the invention.

Example 1

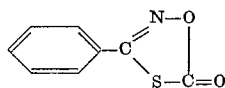

23 g. of benz-thiohydroxamic acid are dissolved in a solution of 12 g. of sodium hydroxide in 200 ml. of water. Gaseous phosgene is subsequently passed into this mixture at 5–10° C., with external cooling and the simultaneous dropwise addition of a solution of 8 g. of sodium hydroxide in 50 ml. of water until the reaction mixture has an almost neutral reaction. The separated crystals are thereafter filtered off with suction and dried. The yield amounts to 17 g. of 3-phenyl-1,4,2-oxathazol-one-5 of M.P. 96–97° C. (from alcohol).

Example 2

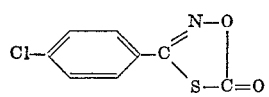

15 g. of 4-chlorobenz-thiohydroxamic acid are dissolved in a solution of 12 g. of sodium hydroxide in 200 ml. of water, and phosgene is passed into this mixture at 5 to 10° C., with external cooling and the simultaneous dropwise addition of a solution of 8 g. of sodium hydroxide in 50 ml. of water until the mixture has a practically neutral reaction. The separated reaction product is filtered off with suction, washed with water, and dried. Yield: 15 g. of 3-(4'-chlorophenyl)-1,4,2-oxathiazol-one. M.P. 135° C. (after recrystallisation from alcohol).

Example 3

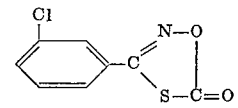

When 15 g. of 3-chlorobenz-thiohydroxamic acid are reacted with phosgene by the method described in Example 2, 12 g. of 3-(3'-chlorophenyl)-1,4,2-oxathiazol-one-5 of M.P. 68° C. (from alcohol) are obtained.

Example 4

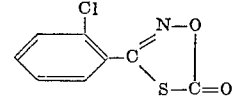

15 g. of 2-chlorobenz-thiohydroxamic acid produce 10 g. of 3-(2'-chlorophenyl)-1,4,2-oxathiazol-one-5 of M.P. 68° C. (from ligroin) by a method analogous to that described in Example 2.

Example 5

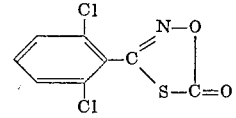

22.2 g. of 2,6-dichlorobenz-thiohydroxamic acid are dissolved in 150 ml. of benzene. 25.5 g. of N,N-dimethylcyclohexylamine are added to this solution, and a slight excess of phosgene is then passed in at 10 to 15° C., with external cooling. The reaction mixture is thereafter stirred for another half hour, and the separated amine hydrochloride filtered off with suction and rinsed with benzene. The combined filtrates are evaporated in vacuo, the residue is recrystallised from a little ligroin, and 15 g. of 3-(2',6'-dichlorophenyl) - 1,4,2 - oxathiazol-one-5 of M.P. 66° C. are obtained.

Example 6

When the procedure is analogous to that in Example 2, the following compounds are obtained from the corresponding starting materials:

| Structure | M.P. | Solvent |
|---|---|---|
| 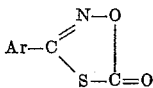 | M.P. 138–140° C. | White spirits. |
| (CH₃O, OCH₃ substituted) | M.P. 143–145° C. | Carbon tetrachloride/ligroin. |
| 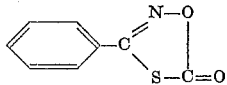 (Cl, Cl, OCH₃ substituted) | M.P. 128–130° C. | Carbon tetrachloride. |
| (CH₃– para substituted) | M.P. 82–84° C. | White spirits. |

We claim:

1. A 3-aryl-1,4,2-oxathiazol-one of the formula

Ar—C(=N—O)—S—C(=O) (cyclic)

in which
Ar stands for a member selected from the group consisting of phenyl, naphthyl and substitution products thereof which are substituted by at least one member selected from the group consisting of alkyl with 1–4 carbon atoms, alkoxy with 1–4 carbon atoms, alkylmercapto with 1–4 carbon atoms, the nitro group, chlorine and bromine.

2. A compound of claim 1 wherein Ar is substituted phenyl, wherein the substituent in chlorine.

3. A compound of the formula (phenyl-substituted oxathiazolone)

4. A compound of the formula

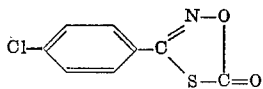

5. A compound of the formula

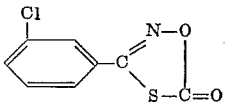

6. A compound of the formula

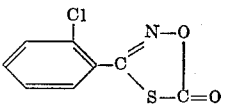

7. A compound of the formula

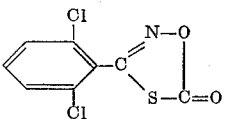

8. A compound of the formula

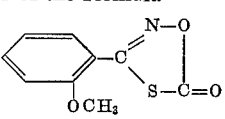

References Cited by the Examiner

UNITED STATES PATENTS

2,752,357  6/56  Watanabe _____ 260—307

OTHER REFERENCES

Huisgen et al.: Angew. Chem., vol. 73, pages 656–7 (1961).
Chem. Abstracts, vol. 56, page 7306g (1962).
Chem. Abstracts, vol. 56, page 1571s (Subject Index) (1962).
Bambas: The Chemistry of Heterocyclic Compounds (New York, 1952), page 221.
Patterson et al.: The Ring Index, Second Edition (Washington, D.C., 1960), page 10.

IRVING MARCUS, *Primary Examiner.*

NICHOLAS S. RIZZO, WALTER A. MODANCE, *Examiners.*